United States Patent
Misumi (10) Patent No.: US 9,419,672 B2
(45) Date of Patent: Aug. 16, 2016

(54) WIRELESS COMMUNICATION DEVICE AND WIRELESS COMMUNICATION METHOD

(71) Applicant: BROTHER KOGYO KABUSHIKI KAISHA, Nagoya-shi, Aichi-ken (JP)

(72) Inventor: Kazuhito Misumi, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 135 days.

(21) Appl. No.: 14/290,060

(22) Filed: May 29, 2014

(65) Prior Publication Data
US 2014/0357201 A1 Dec. 4, 2014

(30) Foreign Application Priority Data
May 31, 2013 (JP) ................................. 2013-115767

(51) Int. Cl.
*H04B 1/44* (2006.01)
*H04B 1/401* (2015.01)
*H04B 1/10* (2006.01)

(52) U.S. Cl.
CPC .............. *H04B 1/401* (2013.01); *H04B 1/1027* (2013.01)

(58) Field of Classification Search
CPC ............ H04B 1/48; H04B 1/44; H04B 1/525; H04B 1/406; H04B 1/18; H04W 84/18; H04W 88/06; H04W 8/005; H04W 88/02; H04W 4/02
USPC .................. 455/77, 78, 418–420, 422.1, 550, 455/556.1, 556.2, 575.1, 575.7, 550.1
See application file for complete search history.

(56) References Cited

U.S. PATENT DOCUMENTS

| 6,580,921 | B1 * | 6/2003 | Inoue | H04B 7/18563 455/437 |
| 6,975,667 | B2 * | 12/2005 | Mattisson | H04B 1/005 375/132 |
| 7,454,210 | B2 * | 11/2008 | Rinne | H04W 36/12 455/442 |
| 8,818,460 | B2 * | 8/2014 | Kim | H04M 1/72563 455/343.1 |
| 2009/0323645 | A1 | 12/2009 | Fukami et al. | |

FOREIGN PATENT DOCUMENTS

| JP | 2005-223822 A | 8/2005 |
| JP | 2008-283368 A | 11/2008 |

* cited by examiner

*Primary Examiner* — Nhan Le
(74) *Attorney, Agent, or Firm* — Merchant & Gould P.C.

(57) ABSTRACT

A wireless communication device has a first wireless communication unit and a second wireless communication unit. A controller of the wireless communication device is configured to set a communication mode of the first wireless communication unit to a normal mode and a high-quality mode. A communication condition using the first wireless communication unit is detected, and whether the particular value is in a particular range indicating certain communication condition or not is determined. When a particular value is in not the particular range, and when the second wireless communication unit is currently in communication with the second external device, the communication mode of the first wireless communication unit is switched to a high-quality mode.

13 Claims, 6 Drawing Sheets

| MEMORY ADDRESS | X1 | X2 | X3 | X4 | X5 | X6 | X7 | X8 | X9 | X10 |
|---|---|---|---|---|---|---|---|---|---|---|
| RSSI[dBm] | RSSI1 -30 | RSSI2 | RSSI3 | RSSI4 | RSSI5 | RSSI6 | RSSI7 | RSSI8 | RSSI9 | RSSI10 | n=4

| MEMORY ADDRESS | X1 | X2 | X3 | X4 | X5 | X6 | X7 | X8 | X9 | X10 |
|---|---|---|---|---|---|---|---|---|---|---|
| RSSI[dBm] | RSSI1 -30 | RSSI2 -40 | RSSI3 -35 | RSSI4 -36 | RSSI5 | RSSI6 | RSSI7 | RSSI8 | RSSI9 | RSSI10 | n=10

| MEMORY ADDRESS | X1 | X2 | X3 | X4 | X5 | X6 | X7 | X8 | X9 | X10 |
|---|---|---|---|---|---|---|---|---|---|---|
| RSSI[dBm] | RSSI1 -30 | RSSI2 -40 | RSSI3 -35 | RSSI4 -36 | RSSI5 -46 | RSSI6 -30 | RSSI7 -35 | RSSI8 -36 | RSSI9 -40 | RSSI10 -38 |

FIG. 4A

| MEMORY ADDRESS | Xa |
|---|---|
| MINIMUM RSSI[dBm] | -46 |

WIRELESS COMMUNICATION DEVICE AND WIRELESS COMMUNICATION METHOD

CROSS-REFERENCE TO RELATED APPLICATION

This application claims priority under 35 U.S.C. §119 from Japanese Patent Applications No. 2013-115767 filed on May 31, 2013. The entire subject matter of the application is incorporated herein by reference.

BACKGROUND

1. Technical Field

The aspects of the invention relate to a wireless communication device having two different wireless communication functions, and a wireless communication method used in such a wireless communication device.

2. Conventional Art

Communication devices having two different wireless communication functions such as a wireless LAN (local area network) and NFC (near field communication) have been known. Such a wireless communication device has two communication ICs (integrated circuits) configured to process transmission/reception of signals (hereinafter, referred to as RF signals) used for the wireless LAN and the NFC, respectively. Generally, such communication ICs are mounted on different substrates, respectively.

In recent years, in view of downsizing and cost-cutting, it has become common to employ single IC (hybrid IC) implemented with both of the wireless LAN function and the NFC function.

In order to realize the downsizing a wireless communication device with less cost, it is further desirable not only to employ the hybrid IC but to mount an antenna for the wireless LAN and an antenna for the NFC on the same substrate on which the hybrid IC is mounted. It is further desirable that such a substrate is as small as possible.

SUMMARY

However, the smaller the substrate is, the shorter a distance between the antenna for the wireless LAN and the antenna for the NFC as the two antennae are arranged close to each other. When the two antennae are closely arranged, a problem as follows may occur. When a wireless communication through the wireless LAN is performed, if a mobile communication terminal having the NFC function approaches the antenna for the NFC of the communication device in order to perform a communication using the NFC function, a radio wave of the wireless LAN may be blocked by the electric conductive portion of the mobile communication terminal, thereby the wireless communication using the wireless LAN function being affected (e.g., terminated).

In consideration of the above problem, aspects of the preset invention are advantageous in that there is provided an improved wireless communication device which is capable of performing wireless communications in compliance with two different wireless communication methods, and is configured such that, even if a first communication device is approaches a second communication device currently performing a first wireless communication, affects of the second communication device on the currently performed wireless communication by the first communication device can be well suppressed.

According to aspects of the invention, there is provided a wireless communication device, having a first wireless communication unit configured to communicate with a first external device in compliance with a first wireless communication method, a second wireless communication unit configured to communicate with a second external device in compliance with a second wireless communication method which is different from the first wireless communication method, and a controller configured to control wireless communication with use of the first communication unit and the second communication unit.

The controller is configured to execute a setting process to set a communication mode of the first wireless communication unit to a normal mode, a condition detecting process to detect a communication condition with the first external device during a wireless communication, using the first wireless communication unit, with the first external device, a determining process to determine a particular value related to the detected communication condition and determine whether the particular value is in a particular range indicating certain communication condition with the first external device, and a switching process when the particular value is in the particular range.

The switching process includes determining whether the second wireless communication unit is currently in communication with the second external device, and switching the communication mode of the first wireless communication unit to a high-quality mode such that the wireless communication is maintained between the first wireless communication unit and the first external device when the second wireless communication unit is currently in communication with the second external device.

According to aspects of the invention, there is provided a wireless communication method employed in a wireless communication device which has a first wireless communication unit configured to communicate with a first external device in compliance with a first wireless communication method and a second wireless communication unit configured to communicate with a second external device in compliance with a second wireless communication method which is different from the first wireless communication method.

The wireless communication method includes a setting step to set a communication mode of the first wireless communication unit to a normal mode, a condition detecting step to detect a communication condition with the first external device during a wireless communication, using the first wireless communication unit, with the first external device, a determining step to determine a particular value related to the detected communication condition and to determine whether the particular value is in a particular range indicating certain communication condition with the first external device, and a switching step when the particular value is in the particular range.

The switching step includes determining whether the second wireless communication unit is currently in communication with the second external device, and switching the communication mode of the first wireless communication unit from the normal mode to a high-quality mode such that the wireless communication is maintained between the first wireless communication unit and the first external device when the second wireless communication unit is currently in communication with the second external device.

DETAILED DESCRIPTION OF THE EMBODIMENTS

Hereinafter, exemplary embodiments according to the invention will be described with reference to the accompanying drawings. It is noted that the invention need not be limited to configurations of the exemplary embodiments described below, but can be modified in various ways without departing the scope of the invention. For example, one or more components of each of the embodiments described below may be replaced with well-known components and/or similar components of another embodiment. Further, two or more embodiments described below may be suitably combined to obtain desired effects.

<First Embodiment>

(1) Wireless Communication System

Figure 1A:
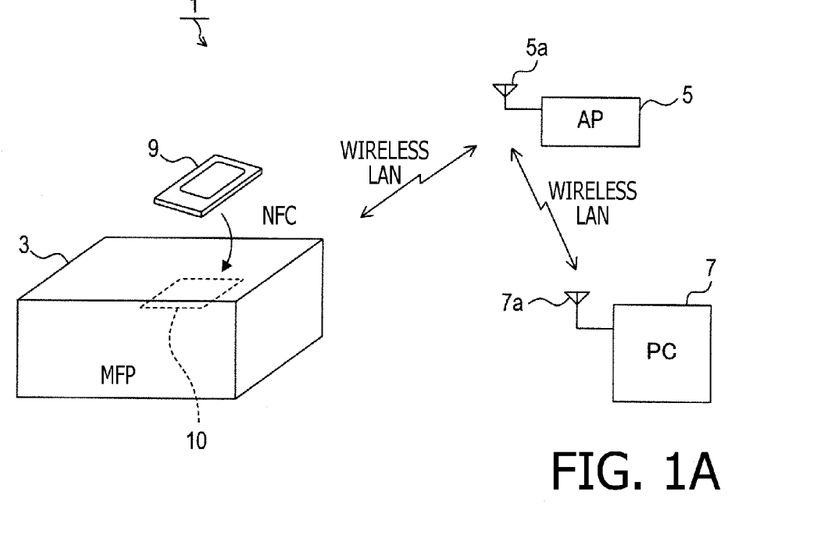
FIG. 1A schematically shows a configuration of a wireless communication system according to an aspect of an embodiment of the invention.

As shown in FIG. 1A, a wireless communication system 1 according to a first embodiment has an MFP (multi-function peripheral) 3, an access point (hereinafter, referred to as an AP) 5, a personal computer (hereinafter, referred to as a PC), and a smartphone 9.

The MFP 3 is configured to perform a plurality of functions including a printer function, a scanner function, a copier function, and the like. The MFP 3 has two wireless communication functions: a wireless LAN (local area network) and an NFC (near field communication). The wireless LAN is a communication method following, for example, IEEE 802.11a/b/g/n standard, and configured to use radio waves of which frequency range band of 2.4 GHz or 5 GHz.

The MFP 3 is capable of performing a wireless communication through the wireless LAN (hereinafter, referred to as a wireless LAN communication) with the AP 5. Thus, the MFP 3 is capable of performing a wireless LAN communication with the PC 7 through the AP 5. The MFP 3 is also capable of accessing the Internet through the AP 5.

Further, the MFP 3 is capable of a wireless communication using the NFC (hereinafter, referred to as an NFC communication) with the smartphone 9. The NFC is a short-rage wireless communication of which a communicatable range is limited within approximately ten centimeters, and using a radio wave band of, for example, a 13.56 MHz. The NFC communication between the MFP 3 and the smartphone 9 is typically performed such that a user of the smartphone 9 locate the smartphone 9 over a predetermined portion (hereinafter, referred to as a near portion) of the MFP 3.

Specifically, the MFP 3 mounts, on an upper portion inside the MFP 3, a wireless communication module 10, which transmits/receives RF signals for both the wireless LAN communication and the NFC communication. The wireless communication module 10 has a loop antenna 14 for the NFC communication (see FIG. 1B). An area above the loop antenna 14 is the near portion described above. When the smartphone 9 is located at the near portion (i.e., above the loop antenna 14), the NFC communication between the MFP 3 and the smartphone 9 becomes possible (i.e., the MFP 3 and the smartphone 9 are in communication using the NFC communication), and a predetermined communication procedure is performed therebetween to establish the NFC communication.

The smartphone 9 is a multi-function mobile terminal and typically has a function to connect with the Internet, and various functions can be added by installing respective applications in addition to functions the cell phone normally has such as an e-mail function and telephone function. The smartphone 9 generally has a CPU, ROM, RAM, a non-volatile memory, I/O (input/output) interface. The smartphone 9 also has an antenna and a communication circuit for NFC communication. In the non-volatile memory, various programs including an OS (operating system) are stored. Programs performing operations using the NFC communication are also store in the non-volatile memory. The communication circuit for the NFC is an RF circuit that realizes the NFC communication with another device (e.g., the MFP 3 ) having the NFC communication function.

The PC 7 has an antenna 7a for transmitting/receiving radio wave for the wireless LAN communication. The PC 7 has a well-known configuration (e.g., a CPU, a ROM, a RAM, an HDD (hard disk drive), an I/O interface, and a communication circuit for the wireless LAN). In the HDD, an OS, a device driver and various application software are installed. A device driver for the MFP 3 is included in the device drivers stored in the HDD. Among the application software stored in the HDD, one for processing the image data which is generate by the scanning function of the MFP 3, one for generating image data which can be printed with the printing function of the MFP 3 and the like are included.

As the PC 7 has the communication circuit for the wireless LAN and the antenna 7a, the PC 7 can perform the wireless LAN communication with the AP 5, and thus, communicate with the MFP 3 with the wireless communication. Accordingly, various types of data including image data can be transmitted/received between the PC 7 and the MFP 3 with the wireless LAN communication through the AP 5.

The AP 5 is a well-known wireless relaying device which provides a data relaying function in the wireless LAN, and has an antenna 5a for transmitting/receiving the radio wave for the wireless LAN communication. The AP 5 sets a communication specification and a communication speed of the wireless LAN, and periodically transmits the information (i.e., the communication specification and the communication speed) with a beacon. The MFP 3 and the PC 7, when the beacon from the AP 5 is received, performs a predetermined process including an authentication process, thereby establishing a wireless connection with the AP 5. When the MFP 3 and the PC 7 has established the wireless connection with the AP 5, the wireless LAN communication becomes possible through the AP 5 (i.e., relayed by the AP 5).

Figure 1B:
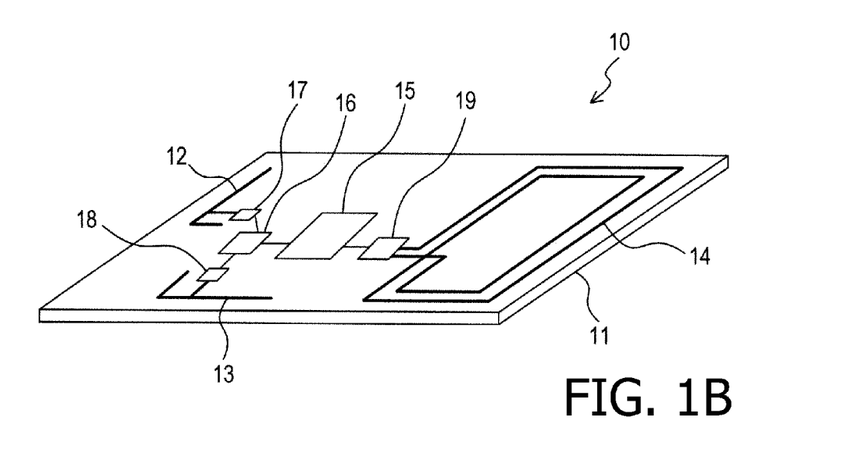
FIG. 1B schematically shows a configuration of a wireless communication module employed in the wireless communication system shown in FIG. 1A.

The wireless communication module 10 mounted on the MFP 3 is configured such that various components are arranged on a substrate 11 (see FIG. 1B). Specifically, on the substrate 11, two antennae 12 and 13 for the wireless LAN, the loop antenna 14 for the NFC communication, the hybrid IC 15, a high-frequency switch 16, three matching circuits 17, 18 and 19 are mounted on the substrate 11.

One side of the rectangular-shaped hybrid IC 15 is connected with the loop antenna 14 through the matching circuit 19. An opposite side of the hybrid IC 15 is connected with the high-frequency switch 16. The high-frequency switch 16 is connected to the antenna 12, which is one of two antennae for the wireless LAN, and to the antenna 13 via the matching circuit 18 which is the other one of the two antennae for the wireless LAN.

The two antennae 12 and 13 for the wireless LAN serve as diversity antennae. The high-frequency switch 16 is controlled by the hybrid IC 15 to selectively connects one of the two antennae 12 and 13 for the wireless LAN to the hybrid IC 15 at a time.

The hybrid IC 15 is an IC (integrated circuit) configured to control both the signals for the wireless LAN and the NFC. When transmission data for the wireless LAN or the NFC is input to from a control circuit (not shown) inside the MFP 3 to the hybrid IC 15, the hybrid IC 15 converts the transmission data into analog transmission signals (i.e., RF signals) and transmits the same from the corresponding antenna.

When the antennae 12 and 13 for the wireless LAN, or the loop antenna 14 receive the radio wave for the communication method corresponding to the antenna, the received signal (i.e., the RF signal) is input to the hybrid IC 15. Then, the hybrid IC 15 converts the input signal into a digital receiving data and transmits the same to the controlling circuit inside the MFP 3.

As described above, the hybrid IC 15 is capable of processing the two types of RF signals for the wireless LAN communication and the NFC communication, individually. Further, the hybrid IC 15 and the antennae 12, 13 and 14 are mounted on the same substrate 11. Therefore, the two antennae 12 and 13 for the wireless LAN communication, and the antenna 14 are close to each other.

(2) Configuration of the MFP 3

Figure 2:
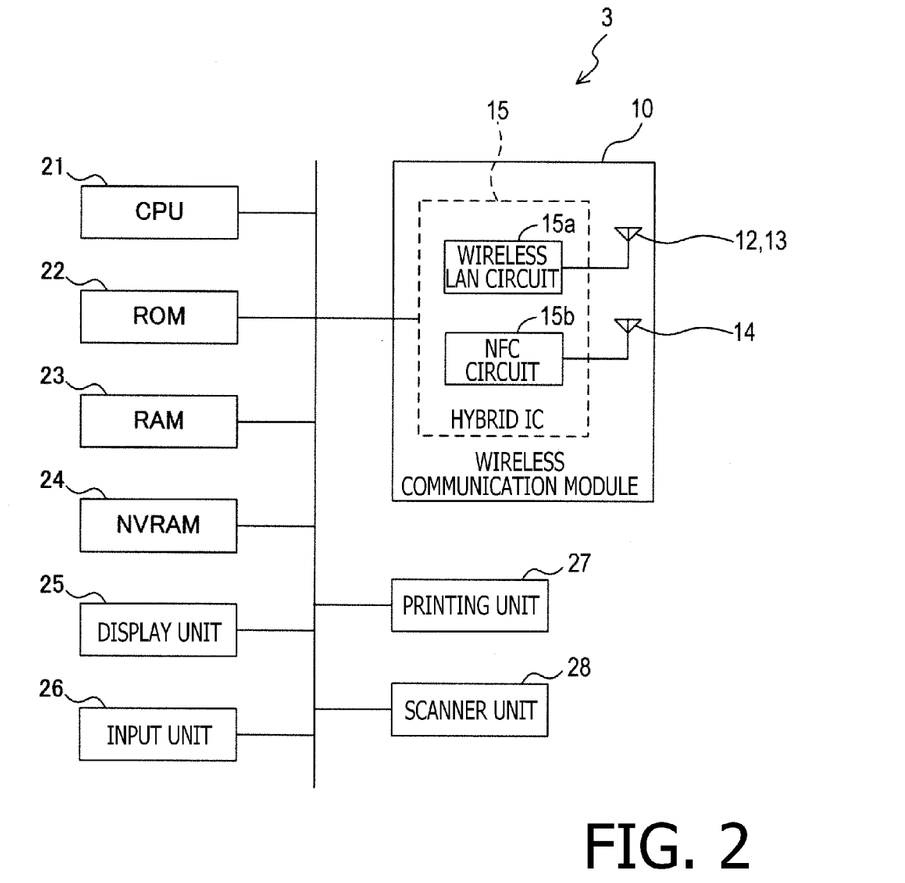
FIG. 2 is a block diagram showing a configuration of an MFP (multi-function peripheral) employed in the wireless communication system shown in FIG. 1A.

The MFP 3 has a CPU 21, a ROM 22, a RAM 23, an NVRAM (non-volatile RAM) 24, a display unit 25, an input unit 26, a printing unit 27 ad a scanner unit 28 (see FIG. 2). Further, the MFP 3 has the wireless communication module 10 (see FIGS. 1A and 1B).

The CPU 21 controls each component of the MFP 3 in accordance with programs stored in the ROM 22 and the NVRAM 24. The RAM 23 is used as a work area which stores various pieces of information and/or a main memory which stores image data. The NVRAM 24 is a non-volatile memory configured such that the stored contents therein can be electrically rewritten, and stores firmware, various setting values, various programs and various pieces of data.

The display unit 25 includes display devices such as an LCD (liquid crystal display), LED (light emitting diode) and the like. The input unit 26 has a touch panel and/or various operation buttons for acquiring user's input. The printing unit 27 is configured to print images on recording medium such as print sheets. The scanner unit 28 has an image sensor, and configured to scan an image on an original and generate image data representing the scanned image.

The wireless communication module 10 has the hybrid IC 15. The hybrid IC 15 is configured to communicate with the CPU 21 and other storages, and is controlled mainly by the CPU 21. It is noted that, in FIG. 2, only the hybrid IC 15 and antennae 12, 13 and 14 are shown and other components are omitted for explanation purpose.

The hybrid IC 15, which a semiconductor integrated circuit, includes a wireless LAN communication circuit 15a and an NFC communication circuit 15b. To the wireless LAN communication circuit 15a, the antenna 12 and 13 are connected. The wireless LAN communication circuit 15a is configured to perform various processes of the RF signals which are transmitted/received by the antennae 12 and 13. To the NFC communication circuit 15b, the loop antenna 14 is connected. The NFC communication circuit 15b is configured to perform various processes of the RF signal which is transmitted/received by the loop antenna 14.

The wireless LAN communication circuit 15a has a function of detecting an RSSI (received signal strength indication) indicating radio field intensity of the radio wave of the wireless LAN communication received by the antennae 12 and 13. The CPU 12 obtains the RSSI of the radio wave received from the AP 5 from the wireless LAN communication circuit 15a, and is configured to process various processes based on the RSSI.

The CPU 21 is capable of controlling each of the wireless LAN communication and the NFC communication through the wireless communication module 10. Regarding the wireless LAN communication, the CPU 21 sets various parameters necessary for the wireless LAN communication. When the wireless LAN communication is performed with the AP 5 or the like, the CPU 21 performs the wireless LAN communication in accordance with the thus set parameters.

For the wireless LAN communication, a parameters of transmission power, a soft wait time (i.e., timeout period), a number of retries and a communication rate.

The transmission power represents the transmission power from each of the antennae 12 and 13 when the wireless LAN communication is performed. According to the first embodiment, a standard power P0 and a high power P1 which is greater than the standard power P0 by a predetermined amount are prepared, and the CPU 21 select one of the standard power P0 and the high power P1.

The soft waiting time (i.e., the timeout period) represents a time period to determine whether data transmission should be retried (i.e., whether the data should be re-transmitted). The CPU 21 transmits the data on a frame basis when transmitting data with the wireless LAN communication. The CPU 21 confirm whether transmitted data has been received by the destination for each frame, and transmits succeeding frame of data after transmission of the proceeding frame of data has been confirmed. If receipt of the data at the destination cannot be confirmed after a predetermined period has passed since the data was transmitted, the CPU 21 re-transmits the same data. The "predetermined period" above is the timeout period.

According to the first embodiment, there are a standard timeout period T0 and an increased timeout period T1 which is longer than the standard timeout period T0 by a predetermined amount, and the CPU 21 is configured to select one of the standard timeout period T0 and the increased timeout period T1.

The number of retries represents the maximum number of re-transmission of the data frame described above. As described above, the CPU 21 is configured to re-transmit the data frame if receipt thereof has not been confirmed. If the re-transmission is executed by a predetermined maximum number of times but receipt of the data at the destination has not been confirmed, a predetermined error process (e.g., termination of re-transmission of data) is performed. According to the first embodiment, a standard number Nr0 of retries and an increased number Nr1 which is greater than the number Nr0 by a predetermined amount, of retries are defined, and the CPU 21 is configured to select one of the numbers Nr0 and Nr1.

The communication rate represents the amount of transmitted data (or received data) within a unit time period as is well-known. According to the first embodiment, the rate is expressed by a unit of bps (bit per second). According to the first embodiment, a standard communication rate R0 and a slow communication rate R1 which is smaller than the standard communication rate R0 by a predetermined amount are defined, and the CPU 21 is configured to select one of the rates R0 an R1.

The CPU 21 switches the settings of the parameters described above in accordance with the communication condition of the wireless LAN communication. Specifically, according to the first embodiment, a normal mode and a high-quality mode are defined as the communication mode of the wireless LAN communication. For the normal mode and the high-quality mode, different sets of parameters are defined.

In the normal mode, the transmission power is set to the standard power P0, the timeout period is set to the standard timeout period T0, the number of retries is set to the standard number Nr0, and the communication rate is set to the standard communication rate R0.

In the high-quality mode, at least one of communication high-quality processes a-d indicated below is executed with respect to the normal mode.

a. To increase the transmission power: the transmission power is set to the high power P1 which is higher than the standard power P0 for the normal mode.
b. To elongate the timeout period: the timeout period is set to the increased timeout period T1 which is longer than the standard timeout period T0 for the normal mode.
c. To increase the number of retries: the number of retries is set to the increased number Nr1 which is greater than the standard number Nr0 for the normal mode.
d. To reduce the communication rate: the communication rate is set to the slow communication rate R1 which is slower than the standard communication rate R0 for the normal mode.

The CPU 21 obtains the RSSI of the radio wave of the wireless LAN communication from the AP 5, and determines the communication condition of the wireless LAN communication. When the communication condition is relatively good, the CPU 21 sets the communication mode to the normal mode, while the communication mode is relatively bad, the CPU 21 sets the communication mode to the high-quality mode.

Which of the processes a-d is executed in the high-quality mode can be determined in various ways. For example, all the processing a-d may be executed. Alternatively, one, two or three of the processes a-d may be selectively executed. It is noted that each of the processes a-d is directed to maintain the wireless LAN communication when the communication condition is deteriorated.

One of the reasons which deteriorate the communication condition of the wireless LAN communication is the smartphone 9 which is located close to the MFP 3 and put over the MFP 3 to perform the NFC communication. When the smartphone 9 is put over the MFP 3, a conductive part of the smartphone 9 is located close to the loop antenna 14 of the wireless communication module 10 of the MFP 3.

As described above, the loop antenna 14 and the antennae 12 and 13 for the wireless LAN communication are arranged close to each other. Therefore, when the smartphone 9 is put over the MFP 3, the conductive part of the smartphone 9 is arranged close to the antennae 12 and 13 for the wireless LAN communication.

Examples of the conductive parts of the smartphone 9 may include conductive patterns (trace) of the substrate 11, wiring inside the smartphone 9, conductive parts of the mounted components, antenna, conductive mechanical parts, casing and the like. Since the conductive portions block radio waves, when the conductive portions of the smartphone 9 approach the antennae 12 and 13 of the MFP 3, the radio wave transmitted/received between the MFP 3 and the AP 5 is blocked by the conductive portions of the smartphone 9, and the communication condition of the wireless LAN communication is deteriorated.

According to the first embodiment, the RSSI of the radio wave of the wireless LAN communication is monitored during the wireless LAN communication, and the communication mode is set to the high-quality mode if the communication condition is deteriorated. By changing the communication mode to the high-quality mode, even under relatively bad communication condition, the quality of the wireless LAN communication between the MFP 3 and the AP 5 is maintained.

(3) Control Process by MFP

Two important processes executed by the CPU 21 of the MFP 3 for selectively setting the two types of communication modes will be described. The two important processes are a minimum RSSI obtaining process and a wireless LAN setting value controlling process.

Firstly, the minimum RSSI value obtaining process will be described. The CPU 21 of the MFP 3 makes the wireless LAN communication with the AP 5 established after booted. When the CPU 21 is making the wireless LAN communication with the AP 5 established, the CPU 21 retrieves a program of the minimum RSSI obtaining process (see FIG. 3) from the ROM 22 or the NVRAM 24, and executes the minimum RSSI obtaining process repeatedly at a predetermined period.

When the minimum RSSI obtaining process (FIG. 3) is started, the CPU 21 determines whether the NFC communication with the smartphone 9 can be performed (S110). Specifically, the CPU 21 attempts to obtain ID (identification) of the smartphone 9 with the NFC communication, and determines whether the ID has been obtained. When the ID has been obtained, the CPU 21 determines that the NFC communication is possible (i.e., the smartphone 9 is put over the MFP 3 ), while when the ID has not been obtained, the CPU 21 determines that the NFC communication cannot be performed (i.e., the smartphone 9 is not put over the MFP 3 ).

Figure 3:
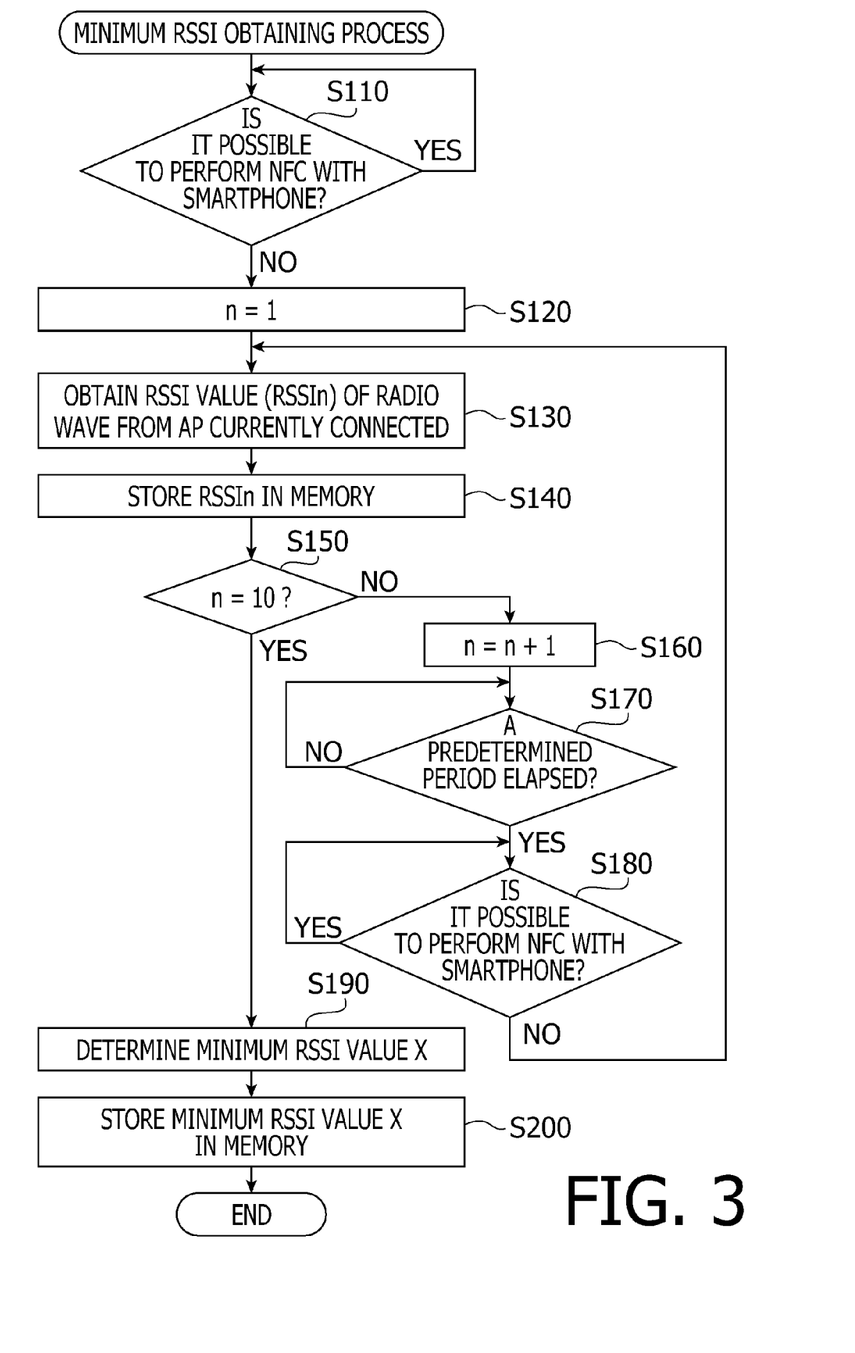
FIG. 3 is a flowchart illustrating a minimum RSSI obtaining process according to an embodiment of the invention.

When the CPU 21 is determining that the NFC communication with the smartphone 9 can be performed (S110: YES), step S110 is repeated. When the CPU 21 determines that the NFC communication with the smartphone 9 cannot be performed (S110: NO), the CPU 21 set a value "1" to a variable n (S120).

In S130, the CPU 21 obtains the RSSI value (RSSIn) of the radio wave from the AP 5 currently being connected. Then, the CPU 21 stores the obtained RSSIn in a memory. It is noted that the memory here may be the RAM 23 or the NVRAM 24. When the variable n is set to one (1), the obtained RSSI value is stored as RSSI1.

Figure 4A:
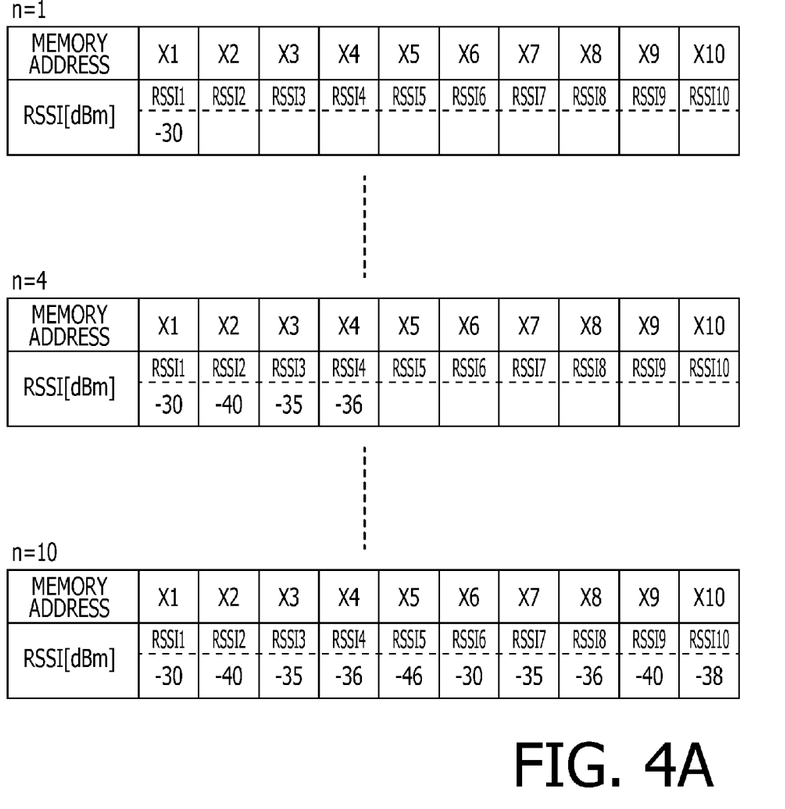
FIGS. 4A and 4B show examples of RSSI values and minimum RSSI value stored in a memory.

In the memory, as shown in FIG. 4A, memory addresses X1-X10 used to store ten RSSI values (i.e., RSSI1-RSSI10) are secured in advance. An uppermost table of FIG. 4A shows an example where a value −30 [dBm] is stored at an address X1 as the RSSI value RSSI1.

After the CPU 21 stores the RSSIn in the memory (S140), the CPU 21 determines whether the variable n is ten (10) at S150. When the variable n is not equal to ten (10) (S150: NO), that is when the variable n is equal to nine (9) or less, the CPU 21 increments the variable n by one (S160), and awaits that a predetermined period has elapsed (S170: NO). When the predetermined period has elapsed (S170: YES), the CPU 21 determines whether the NFC communication with the smartphone 9 is possible (S180) as in S110. When the NFC communication with the smartphone 9 is not possible (S180: NO), the CPU 21 returns to S130, and executes S130 onward. That is, the CPU 21 obtains the RSSI value (RSSIn) from the currently connected AP 5 (S130), stores the obtained RSSIn in a corresponding address (i.e., Xn) in the memory (S140). The above process of obtaining the RSSI value and storing in the memory is repeated until ten RSSI values are stored in the memory.

The middle table in FIG. 4A shows an example in which the RSSI value when n is four is stored in the memory. That is, the middle table in FIG. 4A shows an example where the RSSI values have been stored at the addresses of X1 to X4.

The lowermost table in FIG. 4A shows an example in which the RSSI value when n is equal to ten (10) has been stored in the memory. That is, the lowermost table in FIG. 4A shows a case where the RSSI values have been stored at the addresses of X1-X10. When ten RSSI values have been stored as in this example, the CPU 21 proceeds to S190 and calculate the minimum RSSI value X. Specifically, the CPU 21 obtains the minimum value from among ten RSSI values store in the memory as the minimum RSSI value X. In the example of FIG. 4A, the RSSI value stored in the memory when n is equal to 5 (i.e., RSSI5) is the minimum value, which is −46 [dBm]. Therefore, this value (−46 [dBm]) is obtained as the minimum RSSI value X.

Figure 4B:
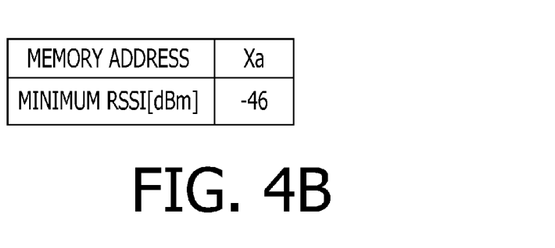

In S200, the minimum RSSI value X is stored in the memory. In the memory, a memory address Xa at which the minimum RSSI value X is assigned in advance. In S200, at this address (i.e., Xa), the minimum RSSI value X obtained in S190 is stored.

According to the first embodiment, the RSSI values of the wireless LAN communication (the RSSI values of the radio wave from the AP 5) when the NFC communication is not performed are obtained a plurality of times (ten times in the embodiment), and the minimum vale (i.e., the value corresponding to the worst communication condition) among the ten RSSI values is obtained as the minimum RSSI value X and stored. The minimum RSSI value X is used in a wireless LAN setting value controlling process as a threshold value for determining the communication condition of the wireless LAN communication.

According to the first embodiment, the minimum RSSI obtaining process (FIG. 3) is repeated periodically, thereby updating the minimum RSSI value stored in the memory periodically. That is, the minimum RSSI value which is the threshold value for determining the communication condition is dynamically changed in accordance with the radio wave environment so that the appropriate minimum RSSI value which corresponds to the radio wave environment is stored.

Next, the wireless LAN setting value controlling process will be described with reference to FIG. 5. The CPU 21 of the MFP 3 retrieves and executes a program for performing the wireless LAN setting value controlling process (FIG. 5) from the ROM 22 or the NVRAM 24 after booted. It is noted that the CPU 21 sets the communication mode to a normal mode in the initializing process which is executed immediately after booted. Therefore, in an initial status, the wireless LAN communication is executed in the normal mode.

Figure 5:
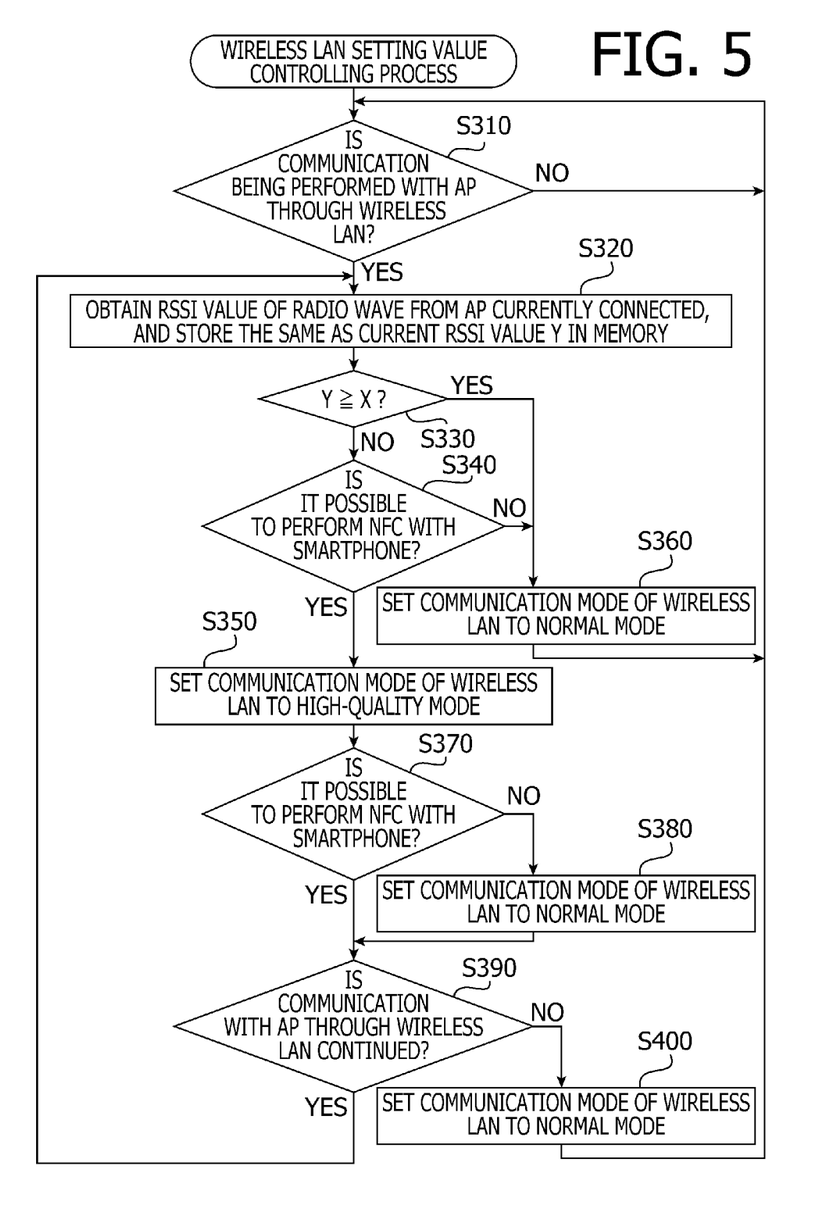
FIG. 5 is a flowchart illustrating a wireless LAN setting value controlling process according to a first embodiment of the invention.

The CPU 21 determines whether the wireless LAN communication with the AP 5 is currently executed (S310) when the wireless LAN setting value controlling process shown in FIG. 5. It is noted that a state in which the wireless LAN communication is being executed is not a state of merely transmitting/receiving beacon, but a state where substantial data communication (e.g., transmission of the image data scanned by the MFP 3 to the PC 7 via the AP 5, receipt of print data, which is transmitted by the PC 7, via the AP 5) is being executed.

When the wireless LAN communication is not performed between the MFP 3 and the AP 5 (S310: NO), 310 is repeated. When the wireless LAN communication is performed with the AP 5 (S310: YES), the CPU 21 proceeds to S320. In S320, the CPU 21 obtains the RSSI value of the radio wave from the currently connected AP 5, and stores the thus obtained RSSI value in the memory as the current RSSI value Y.

In S330, the CPU 21 determines whether the current RSSI value Y, which is stored in S320, is equal to or greater than the minimum RSSI value X (stored in S200 of FIG. 3) or not. When the current RSSI value Y is equal to or greater than the minimum RSSI value X (S330: YES), the current condition of the wireless LAN communication is equal to or better than the condition of the wireless LAN communication when the minimum RSSI value X was obtained. Thus, in this case, the CPU 21 sets the communication mode of the wireless LAN to the normal mode (S360), and returns to S310.

When the current RSSI value is less than the minimum RSSI value X (S330: NO), the condition of the current wireless LAN communication is worse than the condition of the wireless LAN communication when the minimum RSSI X was obtained. Thus, in this case, the CPU 21 determines whether the NFC communication with the smartphone 9 is possible (cf. S110 of FIG. 3) in S340.

When the NFC communication with the smartphone 9 is not available (S340: NO), deterioration of the condition of the wireless LAN communication is caused by a reason other than the closely located smartphone 9 (e.g., a tentative noise). In such a case, the communication mode of the wireless LAN is set to the normal mode (S360) and the CPU 21 returns to S310.

When the NFC communication with the smartphone 9 can be performed (S340: YES), it is assumed that the reason why the communication condition is deteriorated is the closely located smartphone 9. In such a case, the CPU 21 sets the communication mode of the wireless LAN communication to the high-quality mode. That is, the CPU 21 executes at least one of the high-quality processes a-d above.

After the communication mode is set to the high-quality mode, the CPU 21 determines whether the NFC communication with the smartphone 9 is available (S370). When the NFC communication with the smartphone 9 is not available (S370: NO), it is assumed that the smartphone 9 is moved away from the MFP 3. Accordingly, in this case, the CPU 21 sets the communication mode of the wireless LAN communication to the normal mode. Thereafter, the CPU 21 proceeds to S390. When the NFC communication with the smartphone 9 is possible (S370: YES), it is assumed that the smartphone 9 is put over the MFP 3. Therefore, in this case, the CPU 21 proceeds to S390 with maintaining the communication mode of the wireless LAN communication in the high-quality mode.

In S390, the CPU 21 determines whether the wireless LAN communication with the AP 5 is being continued. When the wireless LAN communication is being continued (S390: YES), the CPU 21 returns to S320 and executes the steps S320 onwards. When the wireless LAN communication with the AP 5 is not being performed (S390: NO), it is not necessary to keep the communication mode of the wireless LAN communication in the high-quality mode even if the smartphone 9 is put over the MFP 3. Therefore, in this case, the CPU 21 changes the communication mode of the wireless LAN communication to the normal mode (S400) and the CPU 21 returns to S310.

According to the first embodiment, if the condition of the wireless LAN communication is deteriorated (S330: NO) when the wireless LAN communication is performed in the normal mode, the communication mode is switched to the high-quality mode. Therefore, even in the smartphone 9 is located closer to and put over the MFP 3, thereby the condition of the wireless LAN communication is deteriorated, effects on the wireless LAN communication currently being executed can be suppressed.

According to the first embodiment, the communication mode is not switched to the high-quality mode simply because the condition of the wireless LAN communication is deteriorated. As described above, before switching the communication mode, the CPU 21 determines whether the smartphone 9 is put over the MFP 3 (S340). Accordingly, switching the communication mode to the high-quality mode can be done when it is necessary, and at an appropriate timing.

After the communication mode has been switched to the high-quality mode, when necessity to maintain the high-quality mode is lowered because the smartphone 9 is moved away from the MFP 3 or the wireless LAN communication is terminated, the communication mode is returned to the normal mode. Therefore, the high-quality mode is set only when it is necessary, and unnecessary improvement of the communication quality can be suppressed.

According to the first embodiment, condition of the wireless LAN communication is determined in accordance with the RSSI value of the radio wave transmitted from the AP 5. Specifically, the RSSI value when the NFC communication is not possible is measured, and the measured value is used as a threshold value when the condition of the wireless LAN communication is determined. It is noted that the minimum value of the plurality of (ten, in the embodiment) RSSI values respectively obtained by a plurality of measurements is used as the threshold value. Further, the determination of the threshold value is repeated periodically, and thus the threshold value is updated periodically. Therefore, an appropriate threshold value corresponding to the communication condition of the wireless LAN communication can be obtained. Accordingly, whether the condition of the wireless LAN communication is deteriorated or not can be determined further appropriately.

<Second Embodiment>

Figure 6:
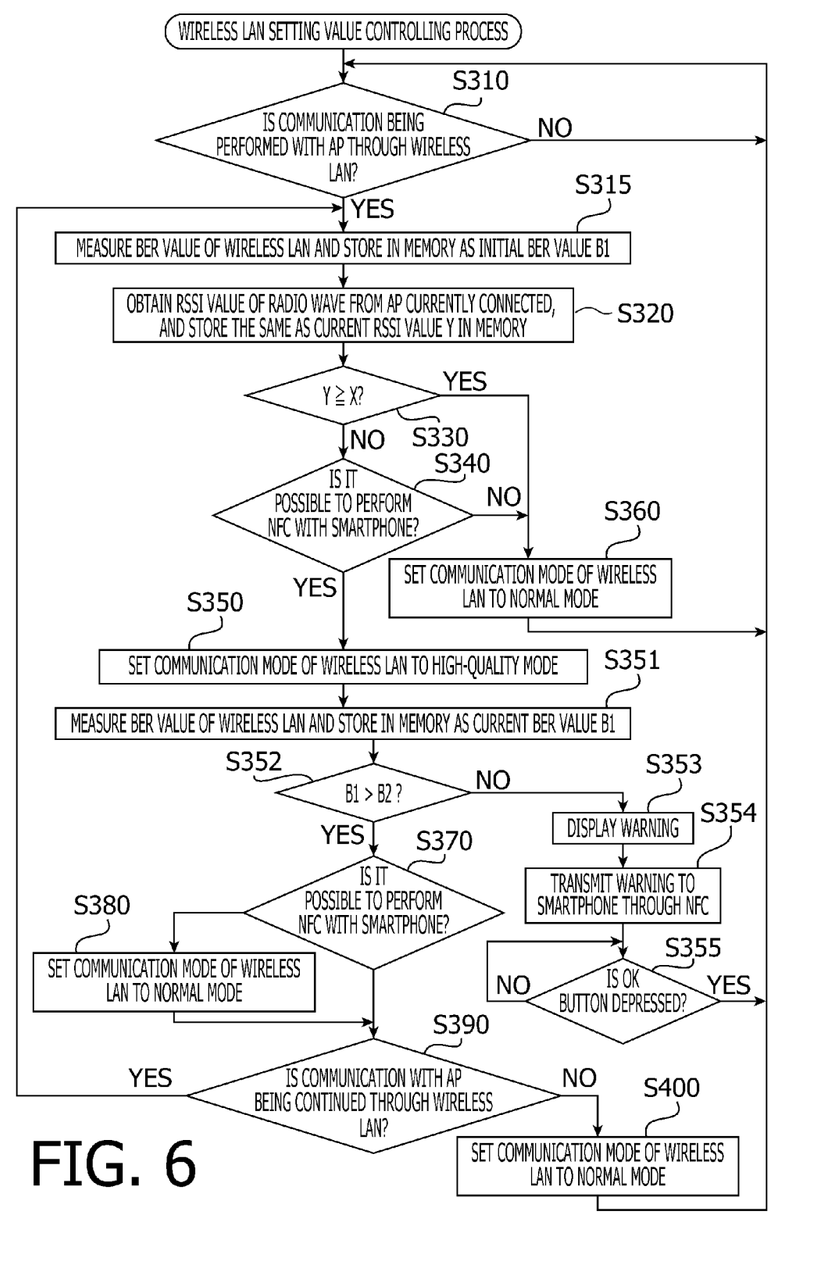
FIG. 6 is a flowchart illustrating a wireless LAN setting value controlling process according to a second embodiment of the invention.

In the second embodiment, the flowchart of the first embodiment shown in FIG. 5 is modified as shown in FIG. 6. Specifically, according to the second embodiment, step S315 is added between steps S310 and S320, and steps S351-S355 are inserted between steps S350 and S370 (see FIG. 5 and FIG. 6).

According to the second embodiment, when the CPU 21 determines that the wireless LAN communication with the AP 5 is being performed (S310: YES), a BER (bit error rate) of the wireless LAN communication is measured (S315), and stores the measured value of the BER as an initial value B1 of the BER in the memory. After S315, the CPU 21 proceeds to S320.

After the mode of the wireless LAN communication has been set to the high-quality mode in S350, the CPU 21 measures the BER of the wireless LAN communication and stores the measured value as a current BER value B2 in the memory. Then, in S352, the CPU 21 determines whether the current BER value B2 stored in S315 is smaller than the initial BER value B1 stored in S351.

When the current BER value B2 is smaller than the initial BER value B1 (S352: YES), that is, the BER is improved, the CPU 21 proceeds to S370. When the current BER value B2 is equal to or greater than the initial BER value B1 (S352: NO), the CPU 21 proceeds to S353 and displays a predetermined warning message/image on the display unit 25. For example, the warning message may be "please move your smartphone away from the MFP, and depress an OK button." As such a warning message is displayed, the user of the MFP 3 recognizes that the condition of the wireless LAN communication is deteriorated due to the closely located smartphone 9.

Further, the CPU 21 transmits warning information to the smartphone 9 via the NFC communication. When the warning information is received from the MFP 3 via the NFC communication, the smartphone 9 executes a predetermined warning indication. With this configuration, the user of the smartphone 9 recognizes that the smartphone 9 may deteriorate the wireless LAN communication of the MFP 3, and can take an appropriate action.

In S355, the CPU 21 determines whether the OK button, which included in the input unit 26 of the MFP 3, is depressed by the user or the like. When the OK button is depressed (S355: YES), the CPU 21 returns to S21.

According to the wireless LAN setting value controlling process shown in FIG. 6, if the deteriorated communication condition of the wireless LAN communication is maintained (i.e., the BER is not improved) even after the communication mode is switched to the high-quality mode, a warning is issued. Therefore, it is possible to encourage the user of the MFP 3 to perform necessary operations.

According to the second embodiment, the warning is displayed on the display unit 25 of the MFP 3 and the warning information is transmitted to the smartphone 9 (and the warning is displayed on the smartphone 9). Therefore, the condition of the wireless communication can be improved quickly and appropriately.

<Modifications and Other Embodiments>

It is noted that the minimum RSSI obtaining process shown in FIG. 3 need not be executed periodically. Execution number of times and timings may be determined arbitrarily. In view of precise determination of the condition of the wireless LAN communication, it is preferable to execute the minimum RSSI obtaining process repeatedly and periodically.

In the exemplary embodiments, switching from the normal mode to the high-quality mode is determined based on the RSSI value (e.g., S330-S350 of FIG. 5). This can be modified such that the switching of the modes is determined based on the BER instead of the RSSI value. Alternatively, both the RSSI value and the BER are used, and the mode may be switched from the normal mode to the high-quality mode when both of or one of the RSSI value and BER is deteriorated.

According to the second embodiment, the CPU 21 determines whether the communication condition is improved based on the BER after the communication mode is changed to the high-quality mode (S350). This configuration may be modified such that the determination is made based on both of the RSSI value and BER, or based on the RSSI value instead of BER.

According to the exemplary embodiments, the RSSI values when the NFC communication is not being performed are measured by ten times, and the minimum RSSI value is set as the threshold value regarding the RSSI value. A method of obtaining the threshold value need not be limited to such a method. For example, the number of times the RSSI value is measured need not be limited to ten, but can be any number. Further, how the threshold value is obtained based on a plurality of RSSI values need not be limited to a method described above, but various methods may be used. For example, the threshold value may be calculated as an average of the plurality of RSSI values.

In the wireless LAN setting value controlling process shown in FIG. 5 and FIG. 6, steps S340, S370 and S380 may be omitted so that the communication mode is set based on the condition of the wireless LAN communication, regardless whether the smartphone 9 is put over the MFP 3 or not.

In the exemplary embodiments, two types of the wireless communication methods are the wireless LAN communication and the NFC communication. It is noted that the wireless communications need not be limited to the above two types of communications. The present invention is applicable to any wireless communication devices employing two different wireless communication methods.

What is claimed is:

1. A wireless communication device, comprising:
   a first wireless communication unit configured to communicate with a first external device in compliance with a first wireless communication method;
   a second wireless communication unit configured to communicate with a second external device in compliance with a second wireless communication method which is different from the first wireless communication method;
   a controller configured to control wireless communication with use of the first wireless communication unit and the second wireless communication unit,
   wherein the controller is configured to execute:
      a setting process to set a communication mode of the first wireless communication unit to a normal mode;
      a condition detecting process to detect a communication condition with the first external device during a wireless communication, using the first wireless communication unit, with the first external device;
      a determining process to determine a particular value related to the detected communication condition and determine whether the particular value is in a particular range indicating certain communication condition with the first external device; and
      a switching process when the particular value is in the particular range,
   wherein the switching process includes:
      determining whether the second wireless communication unit is currently in communication with the second external device; and
      switching the communication mode of the first wireless communication unit from the normal mode to a high-quality mode such that the wireless communication is maintained between the first wireless communication unit and the first external device when the second wireless communication unit is currently in communication with the second external device.

2. The wireless communication device according to claim 1, wherein the controller is configured to execute:
   the determining process when the communication mode is switched from the normal mode to the high-quality mode in the switching process; and
   the setting process when it is determined that the particular value is not in the particular range.

3. The wireless communication device according to claim 2, wherein the controller is configured to execute:
   the determining process when the communication mode is switched from the normal mode to the high-quality mode in the switching process;
   determining whether the second communication unit is currently in communication with the second external unit; and
   the setting process when the second communication unit is determined not to be currently in communication with the second external unit.

4. The wireless communication device according to claim 1, wherein the controller is configured to:
   detect, in the condition detecting process, radio field intensity of a radio wave received from the first external device as the communication condition; and
   determine, in the switching process, whether value indicating the radio field intensity as detected is less than a predetermined radio field intensity threshold value.

5. The wireless communication device according to claim 4, wherein the controller is configured to:
   detect the radio field intensity of the radio wave received from the first external device a plurality of times;
   execute a threshold value determining process to determine a radio field intensity threshold value based on the radio filed intensities as detected in accordance with a predetermined threshold value determining method; and
   determine, in the switching process, using the radio field intensity threshold value determined in the threshold value determining process.

6. The wireless communication device according to claim 5, wherein the controller is configured to update the radio wave intensity threshold value by executing the threshold determining process repeatedly and periodically.

7. The wireless communication device according to claim 1, wherein the controller is configured to execute a warning process when the communication mode is switched from the normal mode to the high-quality mode in the switching process.

8. The wireless communication device according to claim 7, wherein the controller is configured to:
   execute the determining process after the communication mode is switched from the normal mode to the high-quality mode in the switching process; and
   execute the warning process when the particular value indicating certain communication condition is determined is less than the particular value indicating certain communication condition in the determining process.

9. The wireless communication device according to claim 7,
   further comprising a display unit configured to display information;
   wherein the controller is configured to execute at least one of:
      displaying the warning information on the display unit; and
      transmission of the warning information to the second external device using the second wireless communication unit.

10. The wireless communication device according to claim 1, wherein:
    the first wireless communication unit includes a first antenna used to transmit a radio wave in compliance with the first wireless communication method and a first communication circuit connected to the first antenna;
    the second wireless communication unit includes a second antenna used to transmit a radio wave in compliance with the second wireless communication method and a second communication circuit connected to the second antenna;
    the first wireless communication unit and the second communication unit are mounted on a same substrate; and
    the first communication circuit and the second communication circuit are incorporated in a same semiconductor integrated circuit mounted on the substrate.

11. The wireless communication device according to claim 1,
    wherein the first wireless communication method includes:
       transmitting data to be transmitted to the first external device on a frame unit;
       if a response to each transmitted frame is not received from the first external device within a predetermined timeout period, executing re-transmission of the frame to the first external device; and executing an error process if response to a transmitted frame has not been received from the first external device despite a predetermined number of attempts of re-transmission, wherein, in the high-quality mode, the controller executes at least one of:

increasing a transmission power from the first wireless communication unit with respect to the transmission power in the normal mode;

elongating the timeout period with respect to the timeout period in the normal mode;

increasing the number of attempts of re-transmission with respect to the number of attempts in the normal mode; and reducing a communication rate of the first wireless communication mode with respect to the communication rate for the normal mode.

12. The wireless communication device according to claim 1, wherein a communicatable range of the second wireless communication method is smaller than that of the first wireless communication method.

13. A wireless communication method employed in a wireless communication device which has a first wireless communication unit configured to communicate with a first external device in compliance with a first wireless communication method and a second wireless communication unit configured to communicate with a second external device in compliance with a second wireless communication method which is different from the first wireless communication method, the wireless communication method includes:

a setting step to set a communication mode of the first wireless communication unit to a normal mode;

a condition detecting step to detect a communication condition with the first external device during a wireless communication, using the first wireless communication unit, with the first external device;

a determining step to determine a particular value related to the detected communication condition and to determine whether the particular value is in a particular range indicating certain communication condition with the first external device; and a switching step when the particular value is in the particular range, wherein the switching step includes:

determining whether the second wireless communication unit is currently in communication with the second external device; and switching the communication mode of the first wireless communication unit from the normal mode to a high-quality mode such that the wireless communication is maintained between the first wireless communication unit and the first external device when the second wireless communication unit is currently in communication with the second external device.

* * * * *